US010599528B1

(12) United States Patent
Hemashekar et al.

(10) Patent No.: US 10,599,528 B1
(45) Date of Patent: *Mar. 24, 2020

(54) DEVICELESS BROKERLESS BACKUP

(71) Applicant: EMC IP Holding Company LLC, Hopkinton, MA (US)

(72) Inventors: Bharath Siddapur Hemashekar, Santa Clara, CA (US); Kiran Bachu, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/674,319

(22) Filed: Aug. 10, 2017

Related U.S. Application Data

(63) Continuation of application No. 14/510,750, filed on Oct. 9, 2014, now Pat. No. 9,766,985.

(51) Int. Cl.
*G06F 11/14* (2006.01)
(52) U.S. Cl.
CPC ................. *G06F 11/1464* (2013.01)
(58) Field of Classification Search
CPC .................................................. G06F 11/1464
See application file for complete search history.

(56) References Cited

U.S. PATENT DOCUMENTS

| | | | |
|---|---|---|---|
| 8,042,172 B1 | 10/2011 | Heithcock | |
| 8,230,187 B1 | 7/2012 | Krinke, II | |
| 8,886,902 B1 * | 11/2014 | Chien | G06F 11/1469 711/162 |
| 9,632,877 B1 * | 4/2017 | Yin | G06F 11/1469 |
| 2002/0107907 A1 | 8/2002 | Case | |
| 2006/0129615 A1 | 6/2006 | Derk | |
| 2006/0177069 A1 * | 8/2006 | Critchley | H04L 69/16 380/283 |
| 2007/0153720 A1 * | 7/2007 | Baglin | H04W 24/06 370/328 |
| 2007/0286112 A1 * | 12/2007 | Prakash | H04W 36/18 370/319 |
| 2009/0249010 A1 | 10/2009 | Kawada | |
| 2009/0327362 A1 | 12/2009 | Shah | |

(Continued)

OTHER PUBLICATIONS

U.S. Appl. No. 14/510,750, filed Oct. 9, 2014, Hemashekar, et al.

(Continued)

*Primary Examiner* — Joshua Bullock
*Assistant Examiner* — Tiffany Thuy Bui
(74) *Attorney, Agent, or Firm* — Workman Nydegger (57) ABSTRACT

One example method includes sending, from a manager client to a manager server, a recover request that identifies data targeted for recovery and restoration, and receiving, at the manager client, from a server agent at the manager server: a notification that a recover session corresponding to the recover request has been created; and a recover session ID. The method also includes performing, by a backup client, a deviceless recover and restore process after the recover session has been created, and transmitting, after completion of the deviceless recover and restore process, a communication from the manager client to the server agent indicating that the deviceless recover and restore process is complete.

16 Claims, 4 Drawing Sheets

(56) References Cited

U.S. PATENT DOCUMENTS

| | | | |
|---|---|---|---|
| 2010/0248707 A1* | 9/2010 | Hoffner | H04W 24/04 |
| | | | 455/419 |
| 2011/0066595 A1 | 3/2011 | Kreuder | |
| 2011/0225141 A1 | 9/2011 | Chaudhry | |
| 2012/0054767 A1* | 3/2012 | Tateiwa | G06F 9/5027 |
| | | | 718/104 |
| 2012/0179655 A1 | 7/2012 | Beatty | |
| 2012/0239931 A1* | 9/2012 | Takano | G06F 11/1469 |
| | | | 713/170 |
| 2014/0040580 A1 | 2/2014 | Kripalani | |
| 2014/0258534 A1* | 9/2014 | Allrich | H04L 47/822 |
| | | | 709/226 |

OTHER PUBLICATIONS

NPL, ACM Digital Library searched content: results ACM DL: content ftsec:( progress backup session manager "backup application", accessed May 11, 2017.

NPL, Google Search searched content: "first client" second client host target device manager progress mananger "backup session" "backup application"—Google Scholar, accessed May 11, 2017.

U.S. Appl. No. 14/510,750, Dec. 21, 2016, Office Action.

U.S. Appl. No. 14/510,750, May 24, 2017, Notice of Allowance.

\* cited by examiner

DEVICELESS BROKERLESS BACKUP

RELATED APPLICATIONS

This application is a continuation of, and hereby claims priority to, U.S. patent application Ser. No. 14/510,750, entitled DEVICELESS BROKERLESS BACKUP, and filed Oct. 9, 2014, now U.S. Pat. No. 9,766,985. All of the aforementioned applications are incorporated herein in their respective entireties by this reference.

FIELD OF THE INVENTION

Embodiments of the present invention generally concern data backup and restoration. More particularly, at least some embodiments of the invention relate to systems, hardware, computer-readable media, and methods for performing backup and restore processes in an environment where there is a need to manage backups performed by several different backup applications.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Entities may employ a variety of different backup applications, each of which includes a backup client that may be specific to a particular situation, configuration or data type. However, management of the various backups performed in an environment can be difficult due at least to the disparate nature and applicability of the various backup applications in use, and the devices that are targeted for backup by those applications.

Accordingly, entities sometimes use a particular backup application to perform various management duties with respect to backups performed by the other backup clients in the environment. This approach to backup management has proved problematic however, particularly where the managing backup application is called on to perform the cataloguing of backups performed by the other backup clients in the environment.

For example, even if the managing backup application is not directly involved in streaming data for backup, the managing backup application may still require the operation of daemons or other programs to serve as agents for each of the backup clients. In this example, each agent manages a target device by collecting session data from the corresponding backup client and providing that session data to the managing backup application. The use of multiple agents such as these can require significant changes to the configuration of the managing backup application, thus complicating the integration of the multitude of backup clients.

Still another problem with the use of agents, and particularly multiple agents, is that the backup clients are required to maintain a connection to their respective agent, for the purposes of transmitting session information, even though the agents are not being used for data backup by the backup client. This arrangement introduces additional processing and communication overhead in the environment.

Still another problem with arrangements such as that described above relates to the notion of managed and unmanaged devices. In particular, typical backup applications, such as the managing backup application described above, are configured to operate only with managed devices, that is, devices that are under the control of the backup application. However, because it is the backup clients rather than the managing backup application that are actually performing the backups, there are no managed devices associated with the managing backup application. Moreover, the backup applications themselves may operate in connection with unmanaged devices.

Thus, in order for the managing backup application to be able to catalogue backups performed in connection with unmanaged devices, significant modifications are required. In particular, the backup applications are required to create a corresponding dummy target device so that session information concerning the backups performed by those backup applications can be generated, captured, and then transmitted by the agents to the managing backup application for cataloguing. In this way, the dummy target device serves as a managed device that is essentially a proxy for the unmanaged device. While the use of dummy target devices is directed to the problem of cataloguing backups associated with unmanaged devices, it is a cumbersome and complicated approach and becomes increasingly so with larger numbers of backup applications.

One other problem associated with the use of dummy target devices concerns synchronization. In particular, there may be a lack of synchronization between the dummy target devices and the actual target devices.

In light of problems and shortcomings such as those noted above, it would be useful to be able to implement an architecture that would enable a variety of external backup applications to integrate with a managing backup application. It would also be desirable to avoid creation of dummy devices and the use of brokering. Finally, it would be useful to eliminate the need for agents to facilitate creation and cataloguing of session information.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern systems, hardware, computer-readable media and methods for performing backup and restore processes in an environment where there is a need to manage aspects of backups performed by a variety of different backup applications. Such backups may include backups performed in connection with managed target devices that are controlled by one or more backup applications and/or in connection with unmanaged target devices that are not controlled by a backup application.

In at least some embodiments, an extensible architecture is configured and employed so as to enable a managing backup application, which may be referred to herein simply as a 'manager,' to perform various processes with respect to backups performed by other backup applications in connection with managed and/or unmanaged target devices. The manager may be implemented in a client-server arrangement that includes a manager client that is configured to communicate with a manager server and that resides on one or more devices that are backed up by the manager. The manager client also resides, or can be installed, on one or more target devices that are not controlled by the manager. The other backup applications may sometimes be referred to herein as external backup applications to distinguish them from the managing backup application.

More particularly, the nature of the architecture in at least some embodiments is such that the manager is able, in addition to performing its own backup processes regarding one or more target devices that are controlled by the manager, to manage one or more aspects of backups performed by the external backup applications. Such management can include, for example, cataloguing backups performed by the external backup applications, where cataloguing can include, but is not limited to, registering, monitoring and/or reporting on backups.

In one example embodiment, a client of an external backup application can make a determination that aspects of a backup to be performed by the external backup application should be managed by the managing backup application. That is, in at least some instances, the client of the external backup application can decide that the external backup application will perform a deviceless backup involving the managing backup application, and the client of the external backup application can accordingly install, or request the installation of, the manager client on the external backup application server.

The manager client will notify the manager server that a backup to be performed is a deviceless backup, that is, a backup of a device that is not managed by the manager. This notification can include a request for server services relating to the deviceless backup.

After receipt of the request from the manager client, the manager server will authorize and authenticate the request. The response of the manager server can include identifying a saveset/backup identifier for the deviceless backup. The manager server then spawns a server agent, which can be an ad hoc agent, to handle all further requests from the manager client. The manager client uses the server agent to perform a variety of deviceless backup operations before, during and/or after the external backup application performs the backup process. Such deviceless backup operations include, but are not limited to, any one or more of updating the saveset, updating backup/recover progress, updating saveset/backup identifier attributes that are required by the external backup application to identify and recover the backup, adding index records for backup, aborting or closing, as appropriate, the backup/recover session, and cataloguing the backup at the manager server. When the connection between the manager client and the manager server is terminated, the server agent will also be terminated.

Advantageously, the example approach outlined above does not require device selection or reservation. Once the deviceless backup request is received by the manager server from the manager client, the server agent can communicate directly with a media database daemon, that is, a daemon associated with the database that is targeted for backup by the external backup application, and the server agent can create a save-set for the backup session.

In addition or as an alternative to deviceless backup operations, embodiments of the invention can implement deviceless recover operations. In one example recover process, the manager client requests a recover operation on the manager server by providing a saveset/backup identifier. The manager server authenticates the request and uses saveset attributes to verify the deviceless backup saveset and authorize the requested recover operation. The manager server creates a recover session for the external backup application client and, similar to the case of the example deviceless backup process discussed above, the manager server spawns a server agent to handle all further requests from the manager client.

The external backup application client then recovers the data from the backup and restores the data to the device, or devices, managed by the external backup application. Periodic updates on the recover progress are sent by the manager client to the server agent. When the recover operation has been completed, the manager client will end the session with the server agent. The server agent will then close the recover session on server. As may be evident from the preceding discussion, and other disclosure herein, embodiments of the invention may provide various advantages, although it is not necessary or required that any particular embodiment(s) provide any particular advantage(s). Moreover, and consistent with the foregoing statement, embodiments within the scope of one or more claims may additionally, or alternatively, provide one or more advantages not specifically enumerated herein. Finally, to the extent that possible advantages are enumerated herein, those may be present in one or more embodiments in any combination.

A. Example Operating Environments

In general, embodiments of the invention may include and/or be implemented in an operating environment that includes one or more clients and one or more backup servers. Each of the backup servers may host a different respective backup application that operates to backup one or more target devices managed by the backup application.

Advantageously, embodiments of the invention embrace an architecture that enables a variety of different backup applications to integrate with a manager to enable management of backups performed by the backup applications. For example, one of the backup servers can operate as a manager to manage aspects of backups performed by the other backup servers. These backups may be referred to as deviceless backups inasmuch as they involve target devices that are not controlled by the manager.

Even though the manager does not perform the actual backups of those target devices, the manager serves to manage aspects of those backups so that all of the backups in the environment can be catalogued, regardless of which backup application performs a particular backup. Thus, notwithstanding the diversity of backup solutions and target devices that may be employed in an environment, embodiments of the invention provide a mechanism for managing, such as by registering, monitoring and reporting on, the backups performed in connection with those backup solutions and target devices. In addition to managing backups, the manager can also manage restore operations to one or more unmanaged devices, even where a restore operation may involve a backup that was not managed by the manager.

The functionality of the manager may be particularly useful in environments that involve legacy backup target devices such as tapes, disks, and optical media for example, that are managed by backup applications hosted by media servers. These and/or other operating environments for embodiments of the invention may also include one or more devices that are not managed by any media server or backup application. In at least some embodiments, the manager is able to discover backups or snapshots that exist on these unmanaged devices, and the manager can perform various management processes, such as registration for example, of these backups and snapshots.

Figure 1:
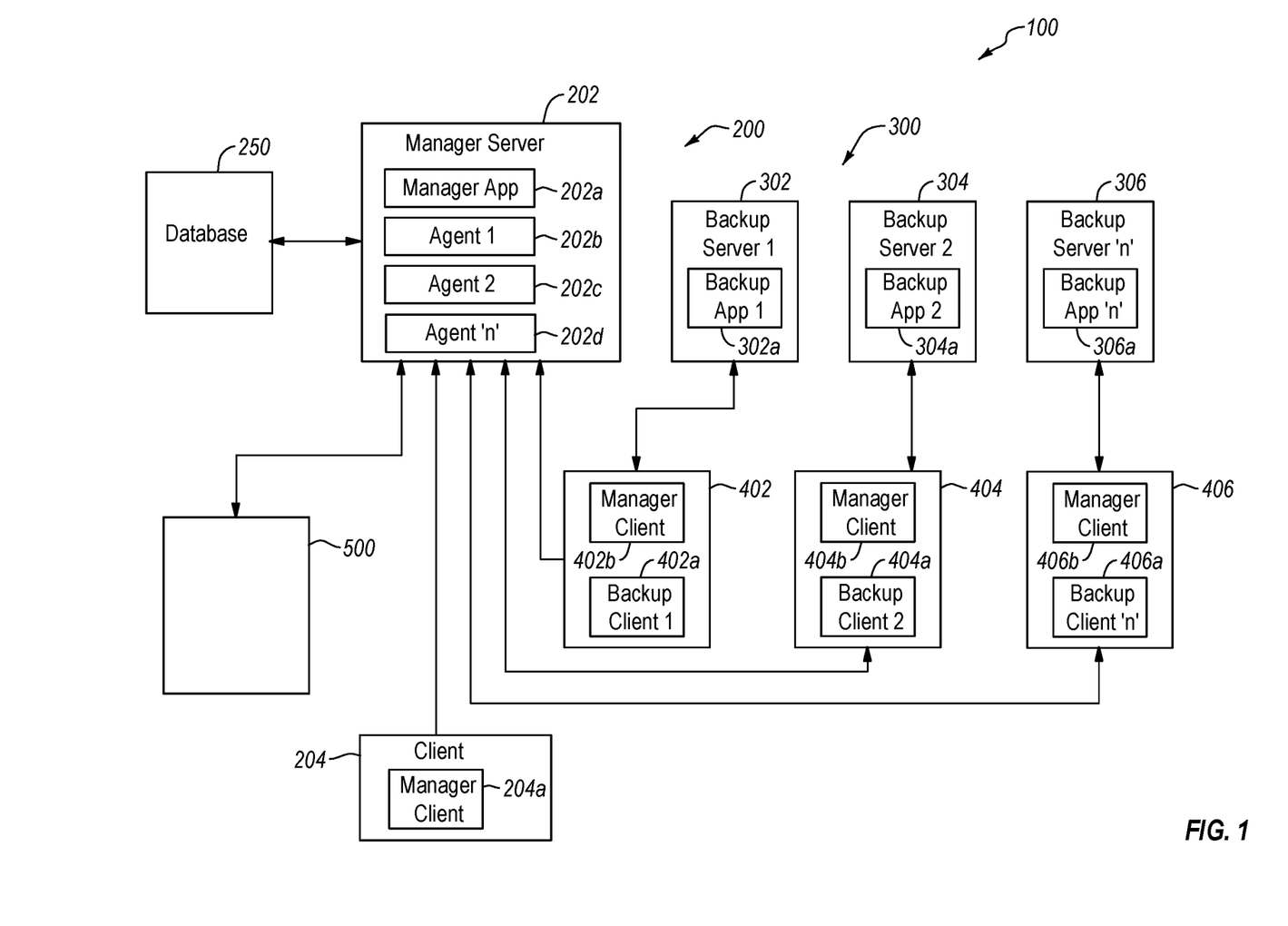
FIG. 1 is directed to aspects of an example operating environment for at least some embodiments.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a host 200 that may take the form of a manager server 202 that communicates with a client 204 to backup and restore data stored at, or otherwise associated with, the client 204. The manager server 202 may communicate with a database 250. As well, the operating environment 100 may include a plurality of hosts 300 that each take the form of a backup server such as backup servers 302, 304 and 306. Each of the backup servers 302, 304 and 306 may communicate with one or more respective clients 402, 404 and 406. In general, and as explained in further detail below, the backup servers 302 . . . 306 may cooperate with the clients 402 . . . 406 to backup and restore data associated with the clients 402 . . . 406. The operating environment 100 can also include one or more unmanaged devices 500, that is, one or more devices not controlled by a backup application. The unmanaged devices 500 can include any device, or combination of devices, that includes data that is desired to be backed up and restored. Example unmanaged devices include, but are not limited to, hosts, clients, or any other computing device(s).

With continued reference to FIG. 1, the manager server 202 can be similar to the backup servers 302 . . . 306 at least insofar as the manager server 202 includes a backup application, such as manager application 202a for example, that cooperates with one or more clients, such as manager client 204a for example, to backup and restore client 204 data. The manager application 202a can be any backup application, and the manager client 204a can be any corresponding backup client. In some example embodiments, the manager application 202a is the EMC NetWorker application, and the manager client 204a is the EMC NetWorker client, although neither the EMC NetWorker application nor the EMC NetWorker client is required to be used.

In addition to a manager application 202a, the manager server 202 may also include, or at least be associated with, agents 1 . . . n, particularly agent 202b, agent 202c and agent 202d. In at least some embodiments, one or more of the agents 202b . . . 202n are created on an ad hoc basis by the manager server 202 for use in connection with backup and restore operations concerning one or more of the clients 402 . . . 406 and the agents 202b . . . 202n are terminated once those operations have been completed.

In general, the agent, or agents, enable the manager server 202 to manage aspects of backup operations performed in connection with one or more of the backup servers 302 . . . 306 and target devices that are not managed by the manager servers, such as clients 402 . . . 406 and/or unmanaged device(s) 550, for example. Management functions performed by and/or at the direction of the manager server 202 and agents 202b . . . 202d can include, but are not limited to, any one or more of updating the saveset, updating backup/recover progress, updating saveset/backup identifier attributes that are required by the external backup application to identify and recover the backup, adding index records for backup, aborting or closing, as appropriate, the backup/recover session, and cataloguing the backup at the manager server, where cataloguing may include, for example, registering, monitoring and/or reporting on backups.

Where the manager application 202a takes the form, for example, of the EMC NetWorker application, the manager application 202a can use nsrd, a daemon providing the NetWorker backup and restore service, to spawn an agent, such as the EMC ansrd program. This daemon, if employed, can reside at the manager server 202, or elsewhere.

As further indicated in FIG. 1, each of the backup servers 302 . . . 306 may host a respective backup application 302a, 304a and 306a. Some example backup applications include, but are not limited to, EMC applications such as Avamar, Mozy, and ProtectPoint. However, embodiments of the invention are not constrained for use with any particular backup application and additional, or alternative, backup applications can be employed. The backup applications 302a, 304a and 306a may be referred to herein as external backup applications inasmuch as they manage devices, namely, clients 402 . . . 406, that are not managed by the manager application 202a.

Each of the backup applications 302a, 304a and 306a cooperates with a respective backup client 402a, 404a and 406a to backup, and recover if necessary, data stored at the clients 402 . . . 406. In addition to communicating with backup servers 302 . . . 306, each of the clients 402 . . . 406 also communicates with the manager server 202.

As indicated, finally, in FIG. 1, one or more of the clients 402 . . . 406 may also install, or request installation of, an instance of the manager client, such as manager client 204a. Thus, clients 402 . . . 406 can include, respectively, a manager client 402b, 404b and 406b. In general, the manager clients 402b . . . 406b can communicate with respective agents 1 . . . n concerning aspects of backups performed cooperatively by the backup applications 302a . . . 306a and the backup clients 402a . . . 406a.

B. Example Host Configuration

Figure 2:
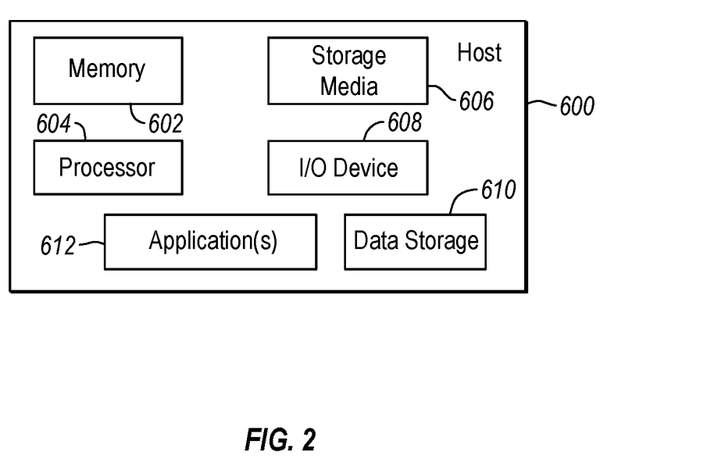
FIG. 2 is directed to an example implementation of a computing device, such as a host, that may be employed with at least some embodiments.

As noted above, any one or more of the clients 204, 402 . . . 406, host 200, hosts 300, and unmanaged device 500 can take the form of a physical computing device, one example of which is denoted at 600. In the example of FIG.

2, the computing device 600 includes a memory 602, one or more hardware processors 604, non-transitory storage media 606, I/O device 608, and data storage 610. As well, one or more applications 612 are provided that comprise executable instructions. Such executable instructions can take the form of one or more of a backup application, a backup client, a manager client, or a manager application.

C. Example Deviceless Backup Methods

Figure 3:
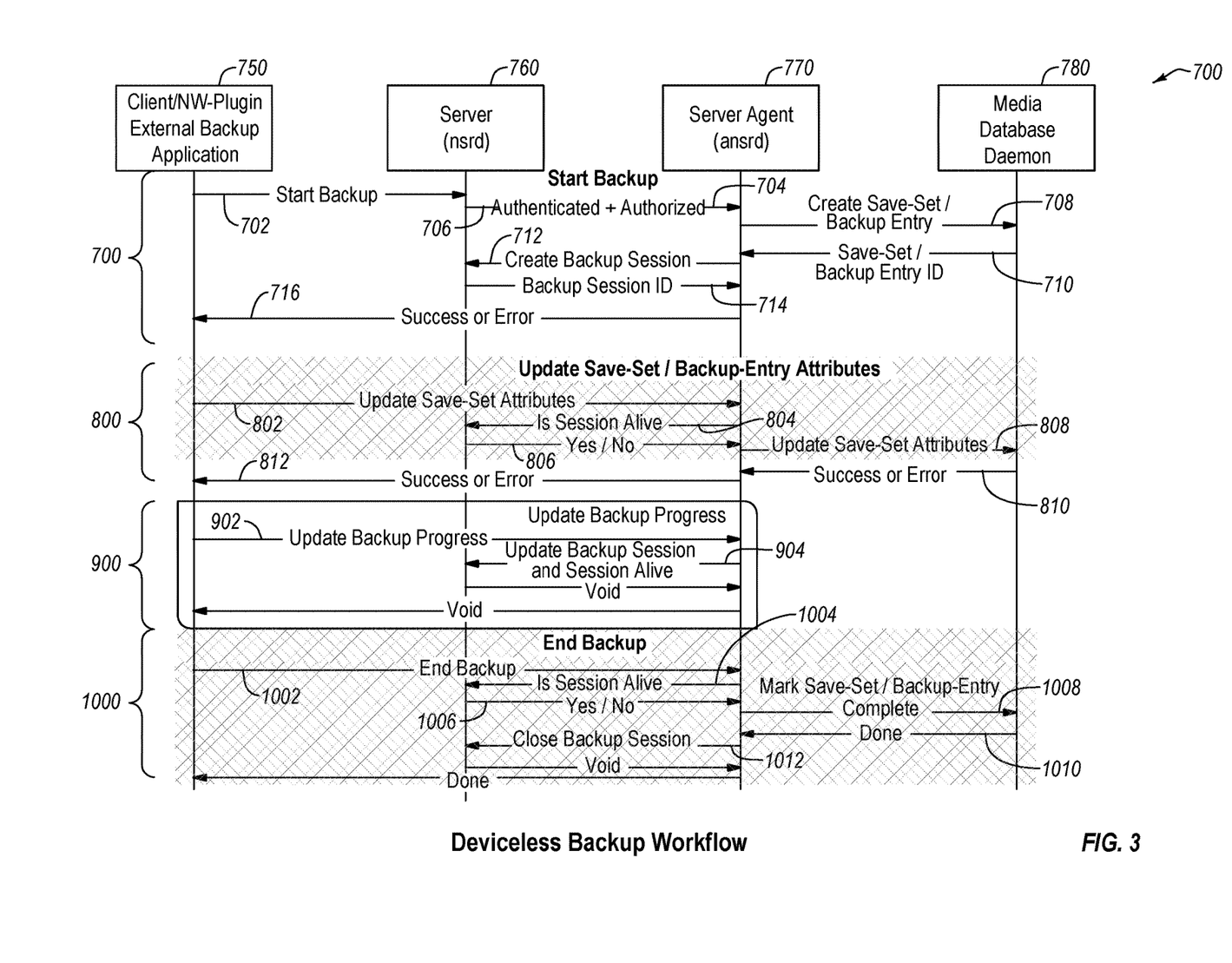
FIG. 3 is a workflow diagram disclosing aspects of various processes employed in a deviceless backup method.

With continued attention to FIG. 1, and directing attention now to FIG. 3, details are provided concerning aspects of example methods relating to a deviceless backup. In general, the methods include a deviceless backup start method denoted generally at 700 which includes various processes that can be performed in preparation for, or in conjunction with, a backup process performed by an external backup application. As well, an updating method 800 includes various processes that can be performed after the operations of the external backup application are completed. A method 900 for updating backup progress is also disclosed that can be performed contemporaneously with the backup being performed by the external backup application. Finally, a method 1000 is directed to concluding the deviceless backup.

As indicated in the example method and arrangement of FIG. 3, a plurality of actors may be involved in one or more aspects of one or more of the disclosed methods. Particularly, a client 750 includes an external backup application client as well as an instance of a manager client, such as the EMC NetWorker client for example. As well, a manager server 760 such as an EMC NetWorker server for example that includes the nsrd daemon and hosts the NetWorker application participates in the method 700 as well. Further, a server agent 770 is involved that is spawned by the manager server 760. In the example configuration where the manager server 760 takes the form of an EMC NetWorker server, the server agent 770 may be the ansrd program, although that is not required in other example embodiments that do not involve NetWorker as the manager application.

Finally, a media database daemon 780, which may be the nsrmmdbd daemon in the EMC NetWorker example, communicates with the server agent 770 concerning the backup. In general, the media database daemon 780 enables read-only access, by the manager client, of a media and save set database managed by the media database daemon 780. As a result of this arrangement, the manager client is able to access information concerning the save set and backed up data but the manager client is not able to access or modify the data itself.

Although the manager server 760 may include a backup application, the backup of the client 750 is not performed by the manager server 760. Rather, the manager server 760, acting through the server agent 770, performs various management processes with respect to a backup performed by way of the external backup application client on the client 750. Thus, with respect to the manager server 760 and the associated manager application, the backup method 700 is an example of a deviceless backup method since the manager application on the manager server 760 does not control the client 750 that is being backed up. Any type, form, format and/or amount of data of the client 750 can be backed up using methods such as the example method 700.

Turning now to the example method 700, the manager client that resides on the client 750 initially determines 702 that it will not stream data with the manager server 760 and instead will use an architecture, examples of which are disclosed herein, to enable the manager server 760 to manage aspects of the backup that will be performed by the external backup application client that resides on the client 750. In some instances, the manager client may have been installed on the client 750 by, or at the request of, the external backup application client on the client 750.

After the manager client has determined that the backup of client 750 will be a deviceless backup, and with specific reference to the example of the NetWorker embodiment, the manager client calls an nsr start/backup start routine requesting from the manager server 760 a deviceless backup session. This deviceless backup request is received by the manager server 760 from the manager client. Next, the manager server 760 spawns 704 a server agent 770 which may or may not reside at the manager server 760, and which responds to further communications to the manager server 760 from the manager client.

The manager application on the manager server 760 authenticates and authorizes 706 the manager client request and communicates the authentication and authorization to the client 750 by way of the agent 770. With respect to such authorization, the manager application can determine that the requested backup is a deviceless backup and the manager application can authorize the operation of the media database and an index database. The media database and the index database may be used to store information relating to the deviceless backup including, for example, metadata concerning the backup and that can be used in recovery processes (media database) and index records (index database) for the backup. Session information can be stored in a resource database of the manager server, such as the database 250 for example.

The server agent 770 then creates and transmits 708 to the media database daemon 780 a saveset/backup entry for the deviceless backup. The media database daemon 780 returns 710 a corresponding saveset/backup entry ID to the client 750 by way of the server agent 770. The server agent 770 then creates 712 a backup session for the backup that will be performed by the external backup application client and the server agent 770 transmits the backup session information to the manager server 760, which then returns 714 a backup session ID to the client 750 by way of the server agent 770. The final process in the deviceless backup start method occurs when the server agent 770 transmits a communication to the manager client on the client 750 that the preliminary management processes have been successfully completed and data backup by the external backup application can commence.

The external backup application then begins a backup of the client 750. In particular, the external backup application client streams the data identified in the saveset(s) to the server where the external backup application resides. The data can be in whatever format is compatible or associated with the external backup application.

As the backup performed by the external backup application progresses, the method 900 provides a mechanism for providing updates to the manager application concerning the progress of that backup. In at least some embodiments, a user interface (UI) is displayed by the manager server 760 that enables a user to view and/or otherwise access information concerning the status and progress of the backup.

As part of the method 900, the manager client can send 902 updates to the server 760, by way of the server agent 770, concerning the progress of the backup that is being performed by the external backup application. The server agent 770 can use this information to provide 904 corresponding updates to the manager server 760. The updates provided by the server agent 770 to the manager server 760 can include, but are not limited to, validating session details, and updating session details with manager client update information. The type and frequency of updates generated by the manager client and server agent 770 can be varied as desired. The updates can be provided periodically, and/or can be tied to the occurrence, or non-occurrence, of particular events, or can be provided on any other basis.

Upon completion of the backup by the external backup application, the method 800 may be employed to effect further updates. For example, the manager client can collect and transmit 802 updated save-set attributes to the manager server 760 by way of the server agent 770. These updates can be performed using one or more application program interfaces (API)s, such as NetWorker Plugin APIs in the specific NetWorker example. Among other things, these updated save-set attributes may be used by the manager client and/or external backup application client to identify and recover the backed up data.

In response to the communication of the updated save-set attributes from the manager client, the manager server 760, acting through the server agent 770 may inquire 804 of the manager client as to whether or not the session is still alive. A response 806 from the manager client to the manager server, again by way of the server agent 770, either confirms that the session is still alive, or confirms that the session is no longer alive. In either case, that is, whether or not the session is still alive, the server agent 770 can transmit 808 updated save-set attributes to the media database daemon 780 which can then respond 810 with an indication as to whether or not the updated save-set attributes were successfully received and catalogued. The response 810 can be transmitted 812 from the media database daemon 780 to the client 750 by way of the server agent 770.

After the save-set and backup-entry attributes have been updated, the deviceless backup can be ended, for example, by using method 1000. Thus, at 1002, the manager client ends the session with the server agent 770. The server agent 770 will request 1004 confirmation that the backup is complete and upon receipt of confirmation 1006, will mark 1008 the backup as complete in the media database. A response from the media database daemon confirms 1010 that the backup has been marked in the media database as complete, and the server agent 770 then closes 1012 the backup session with the manager client. At this point, the deviceless backup processes performed with respect to the backup of the client 750 are complete.

D. Example Deviceless Restore Methods

In addition to deviceless backup methods, the scope of the invention also embraces deviceless recover methods. Accordingly, attention is directed now to FIG. 4 which discloses examples of various methods that can be utilized to perform a deviceless recovery. In general, the methods include a deviceless recover start method denoted generally at 1100 which includes various processes that can be performed in preparation for, or in conjunction with, a backup process performed by an external backup application. As well, an updating method 1200 can be performed that creates and provides updates concerning a deviceless recover. Finally, a method 1300 may be performed that terminates the deviceless recover.

Figure 4:
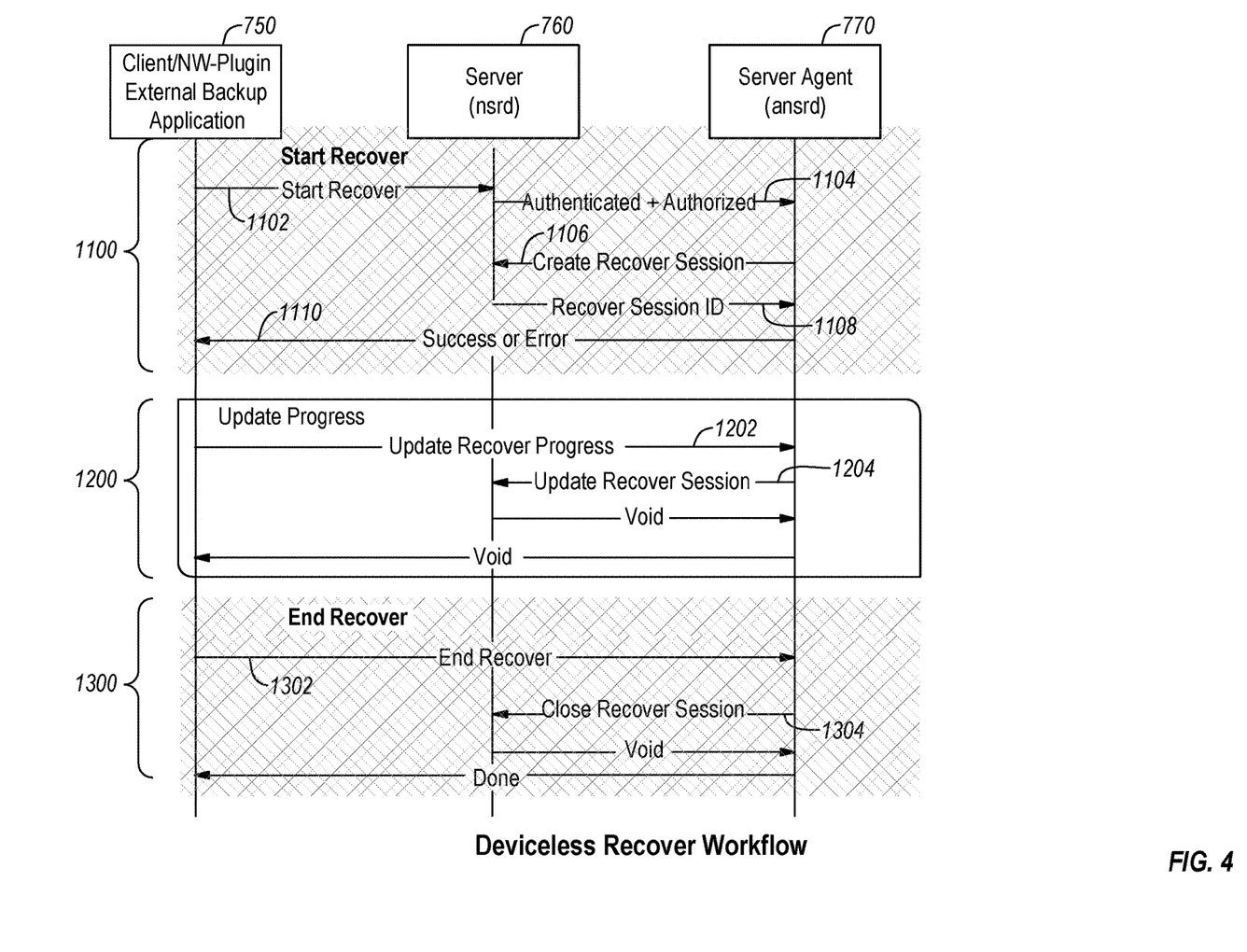
FIG. 4 is a workflow diagram disclosing aspects of various processes employed in a deviceless recover method.

With continued reference to FIG. 4, the example grouping of actors, that is, the client 750, manager server 760 and server agent 770, that may be involved in the various methods are depicted as being similar to the grouping illustrated in FIG. 3, although it should be understood that this is not required and one, some, or all of the actors in FIG. 4 may be the same, or different from, the actors in FIG. 3.

Initially, a deviceless recover method can begin when a manager client residing on the client 750 sends 1102 a recover request to the manager server 760. The recover request can include a saveset/backup identifier that was generated as part of a deviceless backup method. The recover request is received by the manager server 760 which then authenticates 1104 the recover request.

The manager server 760 may also use the saveset attributes with which the saveset/backup identifier is associated to determine that the saveset for which the recover has been requested is a deviceless saveset and to determine that the requested recover operation is a deviceless recover operation, that is, a recover operation that will be performed by an external backup applicant client in relation to a device that is not managed by the manager application. When these determinations have been made, the manager server 760 will then authorize 1104 the recover request.

After authentication and authorization 1104, the manager server 760 creates 1106 a recover session for the manager client and spawns the server agent 770, which may be the NetWorker server agent ansrd, although that particular agent is not required in embodiments that do not involve the NetWorker application. The manager server 760 also generates 1108 a recover session ID that is transmitted to the manager client by the server agent 770. When the recover session has been successfully created, the manager server 760 notifies 1110 the manager client, by way of the server agent 770. If for some reason, the recover session was not able to be created, the manager server will accordingly notify 1110 the manager client.

After the deviceless recover process has been successfully started, the external backup application then begins recovery of the backed up data, and restoration of the recovered data to the client 750. In particular, the external backup application client streams the data identified in the saveset(s) from the device where the backup is stored to the client 750. The data can be in whatever format is compatible or associated with the external backup application.

As the recovery and restoration performed by the external backup application progresses, the method 1200 provides a mechanism for providing updates to the manager application concerning the progress of that recovery and restoration. In at least some embodiments, a user interface (UI) is displayed by the manager server 760 that enables a user to view and/or otherwise access information concerning the status and progress of the backup.

As part of the method 1200, the manager client can send 1202 updates to the server 760, by way of the server agent 770, concerning the progress of the backup that is being performed by the external backup application. The server agent 770 can use this information to provide 1204 corresponding updates to the manager server 760. The updates provided by the server agent 770 to the manager server 760 can include, but are not limited to, validating session details, and updating session details with manager client update information. The type and frequency of updates generated by the manager client and server agent 770 can be varied as desired. The updates can be provided periodically, and/or can be tied to the occurrence, or non-occurrence, of particular events, or can be provided on any other basis.

As the recover and restore performed by the external backup application progresses, a user interface (UI) can be displayed by the manager server 760 that enables a user to view and/or otherwise access information concerning the status and progress of the recover and restore.

When the recover and restore are completed, the manager client will transmit 1302 a communication to the server agent 770 indicating that the recover and restore are complete and that the session with the server agent 770 should be closed. The server agent 770 then closes 1304 the recover and restore session.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   sending, from a first client hosted at a client device, to a manager server, a recover request that identifies data targeted for recovery and restoration, and the first client is a manager client configured to operate in connection with a manager backup application hosted at the manager server;
   receiving, at the first client, from a server agent at the manager server:
      a notification that a recover session corresponding to the recover request has been created; and
      a recover session ID;
   performing, by a second client hosted at the client device, a deviceless recover and restore process after the recover session has been created, and the second client is an external backup client configured to operate in conjunction with an external backup application hosted at a backup server, and the deviceless recover and restore process comprises restoration of data to an entity that is not managed by the manager server;
   transmitting, after completion of the deviceless recover and restore process, a communication from the first client to the server agent indicating that the deviceless recover and restore process is complete.

2. The method as recited in claim 1, wherein a saveset for which the recover request has been made is a deviceless saveset.

3. The method as recited in claim 1, wherein performing, by the second client, the deviceless recover and restore process comprises streaming, by the second client, data identified in the saveset from a device where the saveset is stored to the client device on which the first client and the second client reside, and the client device is managed by the external backup application.

4. The method as recited in claim 1, further comprising transmitting, by the first client, an update to the manager server concerning the progress of the deviceless recover and restore process.

5. A non-transitory storage medium having stored therein instructions which are executable by one or more hardware processors to perform operations comprising:

sending, from a first client hosted at a client device, to a manager server, a recover request that identifies data targeted for recovery and restoration, and the first client is a manager client configured to operate in connection with a manager backup application hosted at the manager server;

receiving, at the first client, from a server agent at the manager server:
- a notification that a recover session corresponding to the recover request has been created; and
- a recover session ID;

performing, by a second client hosted at the client device, a deviceless recover and restore process after the recover session has been created, and the second client is an external backup client configured to operate in conjunction with an external backup application hosted at a backup server, and the deviceless recover and restore process comprises restoration of data to an entity that is not managed by the manager server;

transmitting, after completion of the deviceless recover and restore process, a communication from the first client to the server agent indicating that the deviceless recover and restore process is complete.

6. The non-transitory storage medium as recited in claim 5, wherein a saveset for which the recover request has been made is a deviceless saveset.

7. The non-transitory storage medium as recited in claim 5, wherein performing, by the second client, the deviceless recover and restore process comprises streaming, by the second client, data identified in the saveset from a device where the saveset is stored to the client device on which the first client and the second client reside, and the client device is managed by the external backup application.

8. The non-transitory storage medium as recited in claim 5, wherein the operations further comprise transmitting, by the first client, an update to the manager server concerning the progress of the deviceless recover and restore process.

9. A method, comprising:
receiving, by a manager server, a recover request from a first client hosted by a client device that is not managed by the manager server, and the first client is a manager client configured to operate in connection with a manager backup application hosted at the manager server;
authenticating, by the manager server, the recover request;
authorizing, by the manager server, the recover request;
creating, by the manager server, a recover and restore session for the first client and notifying the first client that the recover and restore session has been created;
spawning, by the manager server, a server agent;
generating, by the manager server, a recover and restore session ID and transmitting, by the server agent, the recover and restore session ID to the first client;
receiving, by the server agent, an update from the first client concerning progress of performance of the deviceless recover and restore process by a second client, and the second client is an external backup client configured to operate in conjunction with an external backup application hosted at a backup server;
transmitting, by the server agent, a corresponding update to the manager server;
receiving, by the server agent, a communication from the first client indicating that a deviceless recover and restore process associated with the recover request is complete, and further indicating that the recover and restore session should be closed, and the deviceless recover and restore process concerns recovery and restoration of data to one of the devices that is not managed by the manager server; and
closing, by the server agent, the recover and restore session.

10. The method as recited in claim 9, wherein the recover request includes a saveset/backup identifier that was generated as part of a deviceless backup.

11. The method as recited in claim 9, wherein a saveset for which the recover request has been made is a deviceless saveset.

12. The method as recited in claim 9, further comprising presenting, by the manager server, a user interface (UI) that enables a user to view and/or otherwise access information concerning the deviceless recover and restore process as the deviceless recover and restore process is performed by a second client, and the second client is an external backup client configured to operate in conjunction with an external backup application hosted at a backup server.

13. The method as recited in claim 9, further comprising using, by the manager server, saveset attributes with which a saveset/backup identifier is associated to determine that the requested recover operation is a deviceless recover operation.

14. A non-transitory storage medium having stored therein instructions which are executable by one or more hardware processors to perform operations comprising:
receiving, by a manager server, a recover request from a first client hosted by a client device that is not managed by the manager server, and the first client is a manager client configured to operate in connection with a manager backup application hosted at the manager server;
authenticating, by the manager server, the recover request;
authorizing, by the manager server, the recover request;
creating, by the manager server, a recover and restore session for the first client and notifying the first client that the recover and restore session has been created;
spawning, by the manager server, a server agent;
generating, by the manager server, a recover and restore session ID and transmitting, by the server agent, the recover and restore session ID to the first client;
receiving, by the server agent, an update from the first client concerning progress of performance of the deviceless recover and restore process by a second client, and the second client is an external backup client configured to operate in conjunction with an external backup application hosted at a backup server;
transmitting, by the server agent, a corresponding update to the manager server;
receiving, by the server agent, a communication from the first client indicating that a deviceless recover and restore process associated with the recover request is complete, and further indicating that the recover and restore session should be closed, and the deviceless recover and restore process concerns recovery and restoration of data to one of the devices that is not managed by the manager server; and
closing, by the server agent, the recover and restore session.

15. The non-transitory storage medium as recited in claim 14, wherein a saveset for which the recover request has been made is a deviceless saveset.

16. The non-transitory storage medium as recited in claim 14, wherein the operations further comprise using, by the manager server, saveset attributes with which a saveset/ backup identifier is associated to determine that the requested recover operation is a deviceless recover and restore operation.

\* \* \* \* \*

UNITED STATES PATENT AND TRADEMARK OFFICE
CERTIFICATE OF CORRECTION

| | | |
|---|---|---|
| PATENT NO. | : 10,599,528 B1 | Page 1 of 1 |
| APPLICATION NO. | : 15/674319 | |
| DATED | : March 24, 2020 | |
| INVENTOR(S) | : Hemashekar et al. | |

It is certified that error appears in the above-identified patent and that said Letters Patent is hereby corrected as shown below:

In the Specification

<u>Column 6</u>
Line 17, change "550" to –500–

Signed and Sealed this
Twenty-sixth Day of May, 2020

Andrei Iancu
*Director of the United States Patent and Trademark Office*